July 31, 1951 LE ROY E. BARINGER 2,562,165
SANITARY POULTRY FOUNTAIN
Filed May 14, 1948
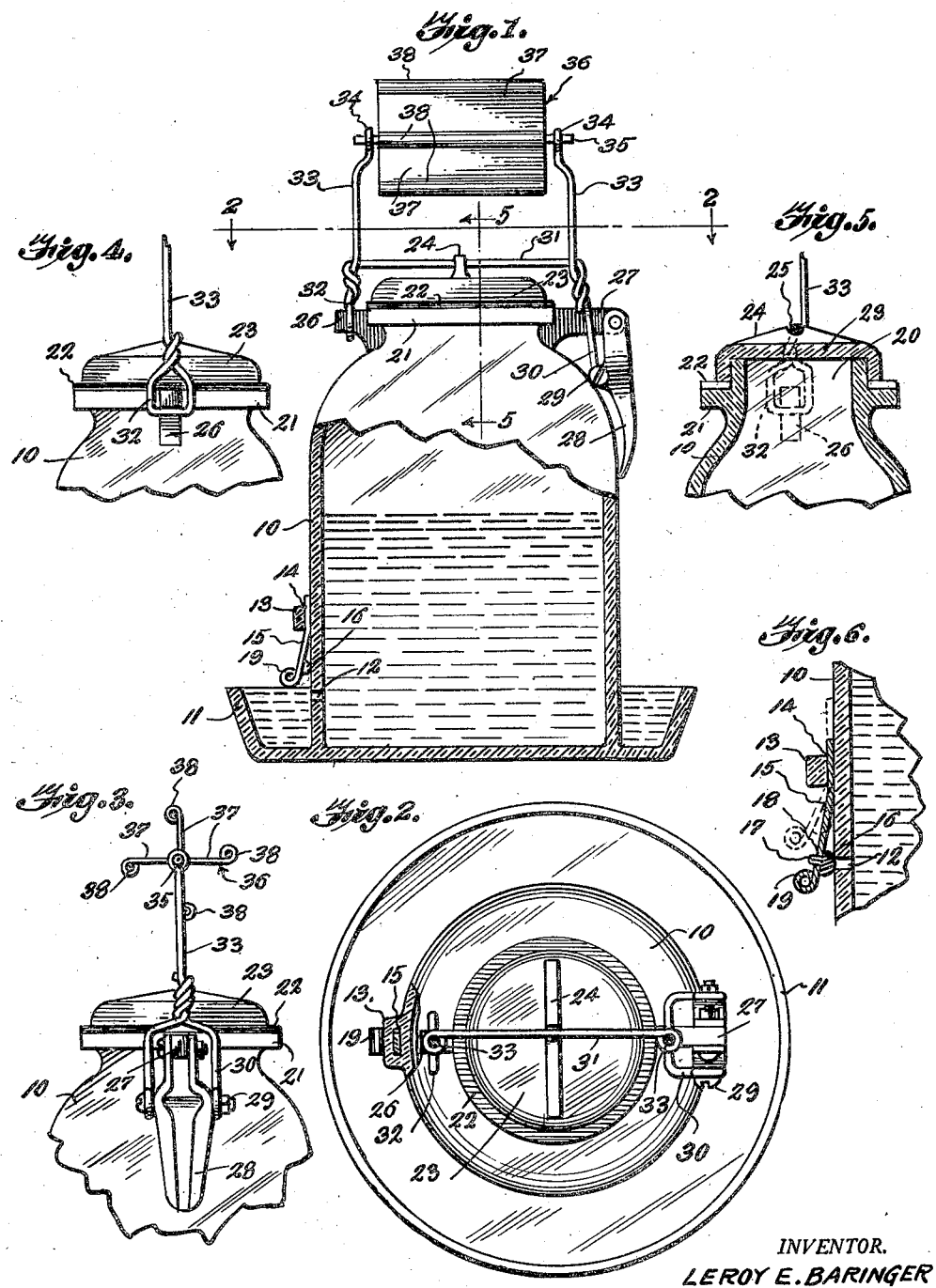
INVENTOR.
LEROY E. BARINGER
BY
Patrick D Beavers
ATTORNEY Patented July 31, 1951

2,562,165

UNITED STATES PATENT OFFICE 2,562,165

SANITARY POULTRY FOUNTAIN

Le Roy E. Baringer, Hardy, Nebr.

Application May 14, 1948, Serial No. 27,111

1 Claim. (Cl. 119—77)

The present invention relates to sanitary poultry fountains and it consists in the combinations, constructions and arrangements of parts herein described and claimed.

It is an object of the present invention to provide a sanitary poultry fountain having a barometric feed and having means whereby the same may be filled without the necessity of tipping or turning.

Another object of the invention is the provision of sanitary poultry fountain having automatic means for preventing poultry from roosting atop the same thus effectively preventing the poultry from allowing droppings to contaminate exposed water.

Another object of the invention is the provision of a novel valve for a water feed outlet forming a part of the invention.

A further object of the invention is the provision of novel means for sealing a filling cap forming a part of the invention.

Other and further objects of the invention will become apparent from a reading of the following specification taken in conjunction with the drawing, in which:

Figure 1 is a front elevational view, partly in section, of an embodiment of the invention, Figure 2 is a sectional view taken along line 2—2 of Figure 1, Figure 3 is a fragmentary side elevational view of the device shown in Figures 1 and 2, Figure 4 is a fragmentary elevational view taken from the side opposite to that shown in Figure 3, Figure 5 is a fragmentary sectional view taken along line 5—5 of Figure 1, and Figure 6 is an enlarged fragmentary sectional view illustrating certain details of construction.

Generally there is provided a sanitary poultry fountain comprising a container having an integrally formed trough about its lower end and having one or more feeder openings in its main body at points below the level of the lip of the trough. The container is provided with a filler cap and a lever-operated clamping member for holding the cap hermetically upon its seat. The clamping member has a pair of upwardly extending arms upon which is revolubly mounted a spinner which is adapted to prevent poultry from roosting upon the top of the device thus keeping the poultry from being in a position to contaminate the water in the trough. The feeder openings are each provided with a novel manually operated valve.

Referring more particularly to the drawing, there is shown therein a container 10 having an outwardly and upwardly integrally formed trough 11 and provided with a series of feeder openings 12 at points immediately below the plane of the upper edge or lip of the trough 11.

Above each of the openings 12 is an ear 13 formed integrally with the container and having a vertically extending opening 14 for the slidable reception of a vertically extending flat spring metal valve holder 15 carrying a valve 16 at its free end. The valve is provided with a stem 17 extending through an opening 18 in the holder. The holder is formed with a curled finger grip 19 at its lower end.

The upper end of the container 10 is provided with a filler opening 20 having an annular outwardly extending lip 21 upon which rests a gasket 22 of rubber or the like. A cap 23 rests upon the gasket and is provided with a diametrically extending ridge 24 having a centrally disposed notch 25 therein.

Upon the outer side of the neck there is provided a pair of outwardly extending integrally formed ears 26 and 27. To the outer end of the ear 27 is pivotally connected a lever 28 to the underside of which is pivotally connected, as indicated at 29, a yoke 30 forming one leg of a wire latch member 31. The other leg is formed as a loop which encloses the leg 26.

Upwardly extending from the latch member 31 is a pair of arms 33 having eyes 34 at their upper ends. Revolubly mounted in the eyes 34 is a horizontally extending axle 35 having revolubly mounted thereon a spinner 36 having a plurality of outwardly extending paddles 37 having curled outer ends 38.

In operation, it will be apparent that when it is desired to fill the device, the lever 28 is moved upwardly thereby releasing the latch 31 from engagement in the notch 25 and permitting the removal of the cap 23. The valve holders 15 are then moved downwardly until the valves 16 seat in the openings 12. Water may then be placed in the container after which the cap is replaced and the lever 28 is moved downwardly and the latch 31 will again engage in the notch 25 to lock the cap hermetically against the gasket 22.

The valve holders are then moved upwardly to unseat the valves 16 from the openings 12. Water will then flow through the openings 12 into the trough 11 until its level in the trough reaches the level of the openings whereupon it will cease to flow in accordance with well-known barometric principles until poultry or evaporation removes some of the water whereupon the process will automatically be repeated until the water level in the container 10 reaches the level of the openings 12 after which the container must be refilled.

The spinner 36 acts to prevent poultry from roosting atop the device as whenever their feet are placed upon any one of the paddles 37 it will move downwardly, preventing them from having a stable base upon which to place their weight. This will keep the poultry from a position wherefrom their droppings might fall into the trough to thereby contaminate the water in the trough 11. The curled edges 38 upon the paddles prevent the poultry from injury as would be the case with ordinary thin edges.

It will be understood that the device will perform its functions with but a single feeder valve, if desired, and that in many instances only one such valve will be utilized.

While but one form of the invention has been shown and described herein, it will be readily apparent to those skilled in the art that many minor modifications may be made without departing from the spirit of the invention or the scope of the appended claim.

What is claimed is:

A poultry watering device comprising a container having an upper end and a lower end and having a plurality of discharge openings adjacent its lower end and a filler opening in its upper end, a trough integrally formed with the lower end of the container and extending upwardly to a point above the discharge openings, a manually operable valve for each of the discharge openings, and a filler cap removably positioned on said filler opening, each of said valves including an ear integrally formed on the side of said container above one of said discharge openings and having a vertical passage therethrough, a spring metal valve holder slidable in said passage, a valve member mounted in said holder adjacent the lower end thereof, and a curled finger piece formed integrally with the lower end of said holder.

LE ROY E. BARINGER.

REFERENCES CITED

The following references are of record in the file of this patent:

UNITED STATES PATENTS

| Number | Name | Date |
| --- | --- | --- |
| 215,079 | Thompson | May 6, 1879 |
| 515,579 | Fischer | Feb. 27, 1894 |
| 1,613,985 | Dennis | Jan. 11, 1927 |
| 1,863,410 | Morin | June 14, 1932 |
| 1,875,230 | Forshee | Aug. 30, 1932 |
| 1,983,613 | Keating | Dec. 11, 1934 |
| 2,136,587 | Gaskill | Nov. 15, 1938 |

FOREIGN PATENTS

| Number | Country | Date |
| --- | --- | --- |
| 23,502 | Great Britain | Oct. 15, 1912 |